(12) United States Patent
Chen et al.

(10) Patent No.: US 12,450,314 B2
(45) Date of Patent: Oct. 21, 2025

(54) SYSTEMS AND METHODS FOR SEQUENTIAL RECOMMENDATION

(71) Applicant: Salesforce, Inc., San Francisco, CA (US)

(72) Inventors: Yongjun Chen, Palo Alto, CA (US); Zhiwei Liu, Chicago, IL (US); Jia Li, Mountain View, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 932 days.

(21) Appl. No.: 17/586,451

(22) Filed: Jan. 27, 2022

(65) Prior Publication Data

US 2023/0073754 A1    Mar. 9, 2023

Related U.S. Application Data

(60) Provisional application No. 63/233,164, filed on Aug. 13, 2021.

(51) Int. Cl.
  *G06N 20/00* (2019.01)
  *G06F 18/23213* (2023.01)
  *G06F 18/2413* (2023.01)

(52) U.S. Cl.
  CPC .. *G06F 18/24137* (2023.01); *G06F 18/23213* (2023.01); *G06N 20/00* (2019.01)

(58) Field of Classification Search
  None
  See application file for complete search history.

(56) References Cited

U.S. PATENT DOCUMENTS

| | | | |
|---|---|---|---|
| 2010/0312726 A1* | 12/2010 | Thompson | G06N 5/022 706/54 |
| 2018/0032606 A1* | 2/2018 | Tolman | G06F 16/93 |
| 2022/0019888 A1* | 1/2022 | Aggarwal | G06F 18/23213 |
| 2022/0237682 A1* | 7/2022 | Zhao | G06F 18/24 |

OTHER PUBLICATIONS

Xie et al. (Xie) "Contrastive Learning for Sequential Recommendation" arXiv preprint arXiv:2010.14395 (2020). 11 pages (this is the same as the applicant provided NPL) (Year: 2020).*

(Continued)

*Primary Examiner* — Xuyang Xia
(74) *Attorney, Agent, or Firm* — Haynes and Boone, LLP

(57) ABSTRACT

Embodiments described herein provides an intent prototypical contrastive learning framework that leverages intent similarities between users with different behavior sequences. Specifically, user behavior sequences are encoded into a plurality of user interest representations. The user interest representations are clustered into a plurality of clusters based on mutual distances among the user interest representations in a representation space. Intention prototypes are determined based on centroids of the clusters. A set of augmented views for user behavior sequences are created and encoded into a set of view representations. A contrastive loss is determined based on the set of augmented views and the plurality of intention prototypes. Model parameters are updated based at least in part on the contrastive loss.

15 Claims, 11 Drawing Sheets

(56) References Cited

OTHER PUBLICATIONS

Renqin Cai et al., Category-aware Collaborative Sequential Recommendation. In Proceedings of the 44th International ACM SIGIR Conference on Research and Development in Information Retrieval. 388-397 .(2021).

Md Mehrab Tanjim et al., sequential models of latent intent for next item recommendation. In Proceedings of The Web Conference 2020. 2528-2534. (2020).

Jianxin Ma et al., Disentangled self-supervision in sequential recommenders. In Proceedings of the 26th ACM SIGKDD International Conference on Knowledge Discovery & Data Mining. 483-491. (2020).

Shoujin Wang et al., Modeling multi-purpose sessions for next-item recommendations via mixture-channel purpose routing networks. In International Joint Conference on Artificial Intelligence. International Joint Conferences on Artificial Intelligence. (2019).

Zhiwei Liu et al., . Basket recommendation with multi-intent translation graph neural network. In 2020 IEEE International Conference on Big Data (Big Data). IEEE, 728-737. (2020).

Zhiqiang Pan et al., An intentguided collaborative machine for session-based recommendation. In Proceedings of the 43rd International ACM SIGIR Conference on Research and Development in Information Retrieval. 1833-1836. (2020).

Jiancan Wun et al., Self-supervised graph learning for recommendation. In Proceedings of the 44th International ACM SIGIR Conference on Research and Development in Information Retrieval. 726-735.(2021).

Xu Xie et al., Contrastive Learning for Sequential Recommendation. arXiv preprint arXiv:2010.14395 (2020).

Tiansheng Yao et al., Self-supervised Learning for Large-scale Item Recommendations. arXiv preprint arXiv:2007.12865 (2020).

Kun Zhou et al., S3-rec: Self-supervised learning for sequential recommendation with mutual information maximization. In Proceedings of the 29th ACM International Conference on Information & Knowledge Management. 1893-1902. (2020).

Xiao Liu et al., Self-supervised learning: Generative or contrastive. IEEE Transactions on Knowledge and Data Engineering (2021).

\* cited by examiner

| Dataset | Metric | BPR | GRU4Rec | Caser | SASRec | DSSRec | BERT4Rec | S³-Rec_isp | CL4SRec | ICLRec | Improv. |
|---|---|---|---|---|---|---|---|---|---|---|---|
| Sports | HR@5 | 0.0141 | 0.0162 | 0.0154 | 0.0206 | 0.0214 | 0.0217 | 0.0121 | 0.0217±0.0021 | 0.0283±0.0006 | 30.48% |
| | HR@20 | 0.0323 | 0.0421 | 0.0399 | 0.0497 | 0.0495 | 0.0604 | 0.0344 | 0.0540±0.0024 | 0.0638±0.0023 | 18.15% |
| | NDCG@5 | 0.0091 | 0.0103 | 0.0114 | 0.0135 | 0.0142 | 0.0143 | 0.0084 | 0.0137±0.0013 | 0.0182±0.0001 | 33.33% |
| | NDCG@20 | 0.0142 | 0.0186 | 0.0178 | 0.0216 | 0.0220 | 0.0251 | 0.0146 | 0.0227±0.0016 | 0.0284±0.0008 | 24.89% |
| Beauty | HR@5 | 0.0212 | 0.0111 | 0.0251 | 0.0374 | 0.0410 | 0.0360 | 0.0189 | 0.0423±0.0031 | 0.0475±0.0012 | 12.17% |
| | HR@20 | 0.0589 | 0.0478 | 0.0643 | 0.0901 | 0.0914 | 0.0984 | 0.0487 | 0.0994±0.0028 | 0.1068±0.0013 | 7.50% |
| | NDCG@5 | 0.0130 | 0.0058 | 0.0145 | 0.0241 | 0.0261 | 0.0216 | 0.0115 | 0.0281±0.0018 | 0.0309±0.0005 | 9.98% |
| | NDCG@20 | 0.0236 | 0.0104 | 0.0298 | 0.0387 | 0.0403 | 0.0391 | 0.0198 | 0.0441±0.0018 | 0.0475±0.0006 | 7.83% |
| Toys | HR@5 | 0.0120 | 0.0097 | 0.0166 | 0.0463 | 0.0502 | 0.0274 | 0.0143 | 0.0526±0.0034 | 0.0590±0.0012 | 12.07% |
| | HR@20 | 0.0312 | 0.0301 | 0.0420 | 0.0941 | 0.0975 | 0.0688 | 0.0235 | 0.1038±0.0041 | 0.1150±0.0016 | 10.74% |
| | NDCG@5 | 0.0082 | 0.0059 | 0.0107 | 0.0306 | 0.0337 | 0.0174 | 0.0123 | 0.0362±0.0025 | 0.0403±0.0002 | 11.34% |
| | NDCG@20 | 0.0136 | 0.0116 | 0.0179 | 0.0441 | 0.0471 | 0.0291 | 0.0162 | 0.0506±0.0025 | 0.0560±0.0004 | 10.57% |
| Yelp | HR@5 | 0.0127 | 0.0152 | 0.0142 | 0.0160 | 0.0171 | 0.0196 | 0.0101 | 0.0229±0.0003 | 0.0257±0.0007 | 12.23% |
| | HR@20 | 0.0346 | 0.0371 | 0.0406 | 0.0443 | 0.0464 | 0.0564 | 0.0314 | 0.0630±0.0016 | 0.0677±0.0016 | 7.47% |
| | NDCG@5 | 0.0082 | 0.0091 | 0.008 | 0.0101 | 0.0112 | 0.0121 | 0.0068 | 0.0144±0.0001 | 0.0162±0.0003 | 12.50% |
| | NDCG@20 | 0.0143 | 0.0145 | 0.0156 | 0.0179 | 0.0193 | 0.0223 | 0.0127 | 0.0256±0.0003 | 0.0279±0.0006 | 8.98% |

FIG. 5

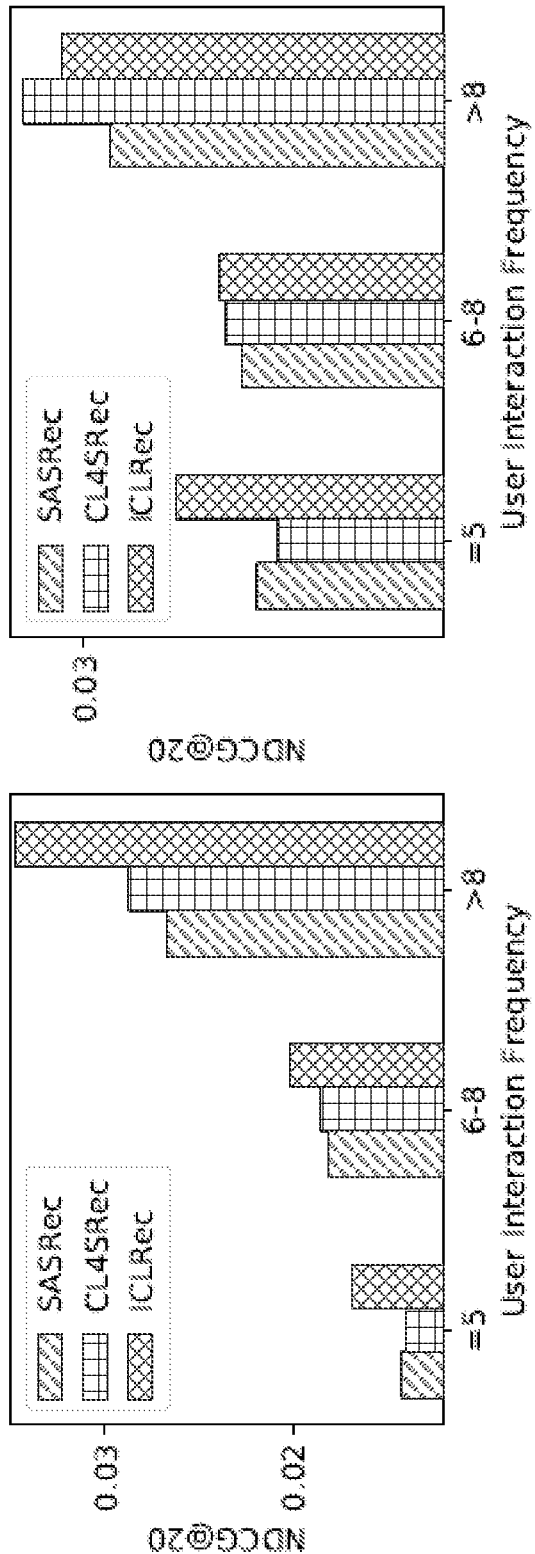

| Model | Dataset | | | |
|---|---|---|---|---|
| | Sports | Beauty | Toys | Yelp |
| (A) ICLRec | 0.0287 | 0.0480 | 0.0554 | 0.0283 |
| (B) w/o FNM | 0.0283 | 0.0465 | 0.0524 | 0.0266 |
| (C) only ICL | 0.0263 | 0.0429 | 0.0488 | 0.0267 |
| (D) w/o ICL | 0.0238 | 0.0428 | 0.0505 | 0.0258 |
| (E), is (C) w/o seq. aug | 0.0242 | 0.0414 | 0.0488 | 0.0213 |
| (F) SASRec | 0.0216 | 0.0387 | 0.0441 | 0.0179 |
| (G) ICL + $S^3$-$Rec_{ISP}$ | 0.0157 | 0.0264 | 0.0266 | 0.0205 |
| (H) $S^3$-$Rec_{ISP}$ | 0.0146 | 0.0198 | 0.0162 | 0.0127 |

*FIG. 8*

| Datasets | SASRec | CL4SRec | ICLRec-A | ICLRec |
|---|---|---|---|---|
| Sports | 0.0216 | 0.0238 | 0.0272 | 0.0275 ($K = 2048$)  0.0287 ($K = 1024$) |
| Yelp | 0.0179 | 0.0258 | 0.0264 | 0.0271 ($K = 1024$)  0.0283 ($K = 512$) |

*FIG. 11*

SYSTEMS AND METHODS FOR SEQUENTIAL RECOMMENDATION

CROSS REFERENCES

The present disclosure is a nonprovisional of and claims priority under 35 U.S.C. 119 to U.S. provisional application No. 63/233,164, filed on Aug. 13, 2021, which is hereby expressly incorporated by reference herein in its entirety.

TECHNICAL FIELD

The embodiments relate generally to machine learning systems and recommendation systems, and more specifically to an intent prototypical contrastive learning mechanism for sequential recommendation.

BACKGROUND

Machine learning systems have been widely used in sequential recommendation tasks. A system may, for example, take a sequence of past user behavior such as a sequence of purchased items, and based on that recommend another item for purchase. Existing approaches in Sequential Recommendation (SR) leverage self-supervised learning (SSL) to train a machine learning model to generate sequential recommendations. Such existing systems focus on capturing mutual information between positive views of individual user-level data, e.g., a correlation between an item in a sequence of items a user has interacted with and the surrounding items in the sequence, or two sub-sequences from a given sequence of item interactions.

By only maximizing the agreement of two views from one sequence, the existing approaches ignore correlations between user sequences (e.g., sequences from two users with similar intent). Existing approaches contrast sequences as negative pairs when they are from different users, even if the users display similar behavior, and erroneously push apart similar sequences in the feature space. Therefore, these existing approaches are not sufficient to learn optimal representations of user behavior.

BRIEF DESCRIPTION OF THE DRAWINGS

FIG. 5 provides an example table illustrating example performance of different sequential recommendation methods including one embodiment discussed herein.

FIGS. 6A-6B provide example charts illustrating performance comparisons of different models including one embodiment discussed herein.

FIG. 8 provides an example table illustrating example performance of different sequential recommendation methods discussed herein.

FIG. 11 provides an example table illustrating quantitative performance results.

Figure 1:
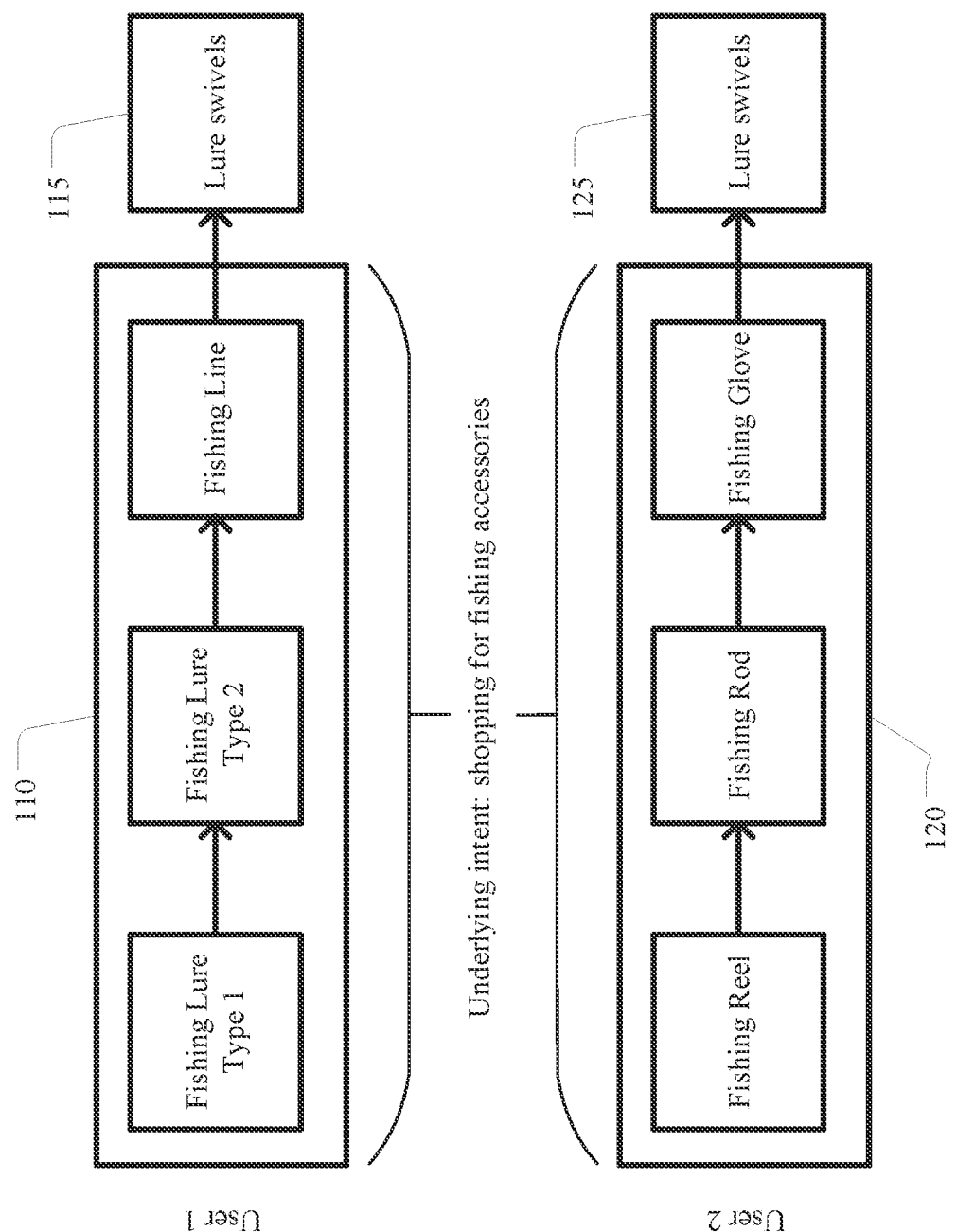
FIG. 1 is a simplified diagram showing examples of user behavior sequences with the same underlying intent.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Sequential recommendation (SR) systems are used to predict a user's interest to items based on their historical interactions. However, due to severe data-sparsity, it is challenging to train a large amount of parameters in a deep SR model, and therefore challenging to accurately reveal item relationships in sequences. Self-supervised learning (SSL) may be used to construct auxiliary supervision tasks via recognizing the transformation of the data itself. For example, in contrastive learning, alternate "views" of the data may be generated using a number of methods, and then a training objective may be computed aiming at maximizing the agreement between positive "views" of the data while pushing the negative "views" of the data away in the feature space. The traditional contrastive learning method, however, can be insufficient, because these methods merely learn the features of each individual items by creating "positive" or "negative" views of each data sample but often ignore the correlations among different users, e.g., a group of users with similar interests. For example, two users' behavior sequences can be regarded as negative pairs as the items associated with the sequences belong to different users even if the two users have similar interests. As a result, users with similar interests are erroneously pushed away in the users' representation space.

Modern sequential recommendation models commonly encode user behavior sequences with a deep neural network to model sequential patterns from (truncated) user historical behavior sequences. An encoder $f_\theta(\cdot)$ may be used to encode a sequence $S^u$ and output user interest representations over all position steps $H^u = f\theta(S^u)$. Specially, $h_t^u$ hut represents a user's interest at position t. The goal can be formulated as finding the optimal encoder parameter $\theta$ that maximizes the log-likelihood function of the expected next items of given N sequences on all positional steps:

$$\theta^* = \arg\max_\theta \Sigma_{u=1}^{N} \Sigma_{t=2}^{T} \ln P_\theta(s_t^u)$$

This is equivalent to minimizing the adapted binary cross-entropy loss as follows:

$$\mathcal{L}_{NextItem} = \Sigma_{u=1}^{N} \Sigma_{t=2}^{T} \mathcal{L}_{NextItem}(u,t)$$

$$\mathcal{L}_{NextItem}(u,t) = -\log(\sigma(h_{t-1}^u \cdot s_t^u)) - \Sigma_{neg} \log(1-\sigma(h_{t-1}^u \cdot s_{neg}^u))$$

In the equations above, $\sigma$ is the sigmoid function, N is the mini-batch size of the SR model, $s_t^u$ denotes the embedding of the target item $s_t$, and $s_{neg}^u$ denotes the embedding of all items not interacted by u. The sum operator in the last equation is computationally expensive because the set of items not interacted with by u is in general very large. To mitigate this, a sampled softmax technique may be used to randomly sample a negative item for each time step in each sequence. $\sigma 0$ is the sigmoid function. And N is refers to the mini-batch size as the SR model.

Contrastive SSL may be used to fuse correlations among different views of one sequence, following the mutual information maximization (MIM) principle. Existing approaches in SR can be seen as instance discrimination tasks that optimize a lower bound of MIM, such as InfoNCE. It aims to optimize the proportion of gap of positive pairs and negative pairs. In such an instance discrimination task, sequence augmentations such as 'mask', 'crop', or 'reorder' are required to create different views of the unlabeled data in SR. Formally, given a sequence $S^u$, and a pre-defined data transformation function set G, a contrastive SSL system can create two positive views of $S^u$ as follows:

$$\tilde{s}_1^u = g_1^u(S^u), \tilde{s}_2^u = g_2^u(S^u), s.t. g_1^u, g_2^u \sim G$$

In the equation above, $g_1^u$ and $g_2^u$ are transformation functions sampled from G to create a different view of sequence $s_u$. Views created from the same sequence are treated as positive pairs, and traditionally the views of any different sequences are considered as negative pairs. The augmented views are first encoded with the sequence encoder $f_\theta(\cdot)$ to $\tilde{H}_1^u$ and $\tilde{H}_2^u$, and then fed into an 'Aggregation' layer to get vector representations of sequences, denoted as $\tilde{h}_1^u$ and $\tilde{h}_2^u$. For simplicity, users' interest representations are concatenated over time steps. Sequences are prepossessed to have the same length, thus their vector representations after concatenation have the same length too. After that, the contrastive SSL system can optimize $\theta$ via InfoNCE loss:

$$\mathcal{L}_{SeqCL} = \mathcal{L}_{SeqCL}(\tilde{h}_1^u, \tilde{h}_2^u) + \mathcal{L}_{SeqCL}(\tilde{h}_2^u, \tilde{h}_1^u)$$

and $$\mathcal{L}_{SeqCL}(\tilde{h}_1^u, \tilde{h}_2^u) = -\log \frac{\exp(sim(\tilde{h}_2^u, \tilde{h}_1^u))}{\sum_{neg} \exp(sim(\tilde{h}_1^u, \tilde{h}_{neg}))}$$

In the above equations, $sim(\cdot)$ is a dot product and $\tilde{h}_{neg}$ are negative views' representations of sequence $S^u$.

The main goal of next item prediction task is to optimize encoder parameter $\theta$ as described above. Assuming that there are K different user intents (e.g., purchasing holiday gifts, preparing for fishing activity, etc.) in a recommender system that forms the intent variable $c = \{c_i\}_{i=1}^K$, then the probability of a user interacting with a certain item can be rewritten as follows:

$$P_\theta(s^u) = \mathbb{E}_{(c)}[P_\theta(s^u, c)]$$

However, users' intents are latent by definition. Parameter $\theta$ is needed in order to infer parameter c, but parameter c is needed in order to estimate parameter $\theta$. Because of this, an expectation-maximization (EM) framework may be used to address the above problem with a convergence guarantee. The basic idea of optimizing this equation via EM is to start with an initial guess of the model parameter $\theta$ and estimate the expected values of the missing variable c, i.e., the E-step. And once the values of c are determined, the equation can be maximized with respect to the parameter $\theta$, i.e., the M step. This iterative process may be repeated until the likelihood cannot increase anymore.

In view of the deficiency to recognize user-level similarities in existing methods, aspects of the present disclosure include leveraging mutual intent information across users (a collaborative signal) via SSL. The motivation is that users can have similar underlying intentions behind their behavior sequences. For example, two users with distinct purchase behaviors may share a similar intent, e.g., two users may each have an intent to prepare for a fishing trip, but each user may purchase or interact with a different set of items. One benefit of leveraging such information is it can discover a semantic structure across different user behavior sequences to benefit user representation learning. Also, it can reduce the reliance on the captured individual user-level mutual information, providing a more robust SR model.

In order to learn good user intent representations and leverage the learned user intent information into an SR model, aspects of the present disclosure provide Intent Contrastive Learning (ICL) that incorporates user intent knowledge into contrastive learning. Specifically, the intent prototypes are defined to describe users' intentions underlying their behavior sequences and are represented by latent variables. In some aspects, the method iteratively performs clustering over users' interest representations and treats the centroids of learned clusters as intent prototype representations. The method may maximize the agreement between a positive view of the user behavior sequence (an augmented sequence of the original one) and the user's intention via a contrastive SSL objective, in which users with the same intention will be pulled closer to each other in the representation space.

FIG. 1 is a simplified diagram showing examples of user behavior sequences with the same underlying intent. User 1 has a behavior sequence 110 which includes different types of fishing lures, and fishing line. A sequential recommendation system may recommend lure swivels 115 based on the past user behavior 110. User 2 may have a different behavior sequence 120 which has the same underlying intent of preparing for a fishing trip. As illustrated, user behavior sequence 120 includes a reel, a fishing rod, and gloves. Even though the sequences 110 and 120 are different, they may share the same underlying intent (e.g., shopping for fishing accessories). A sequential recommendation system may therefore recommend the same lure swivels 125 as were recommended for User 1.

Figure 2:
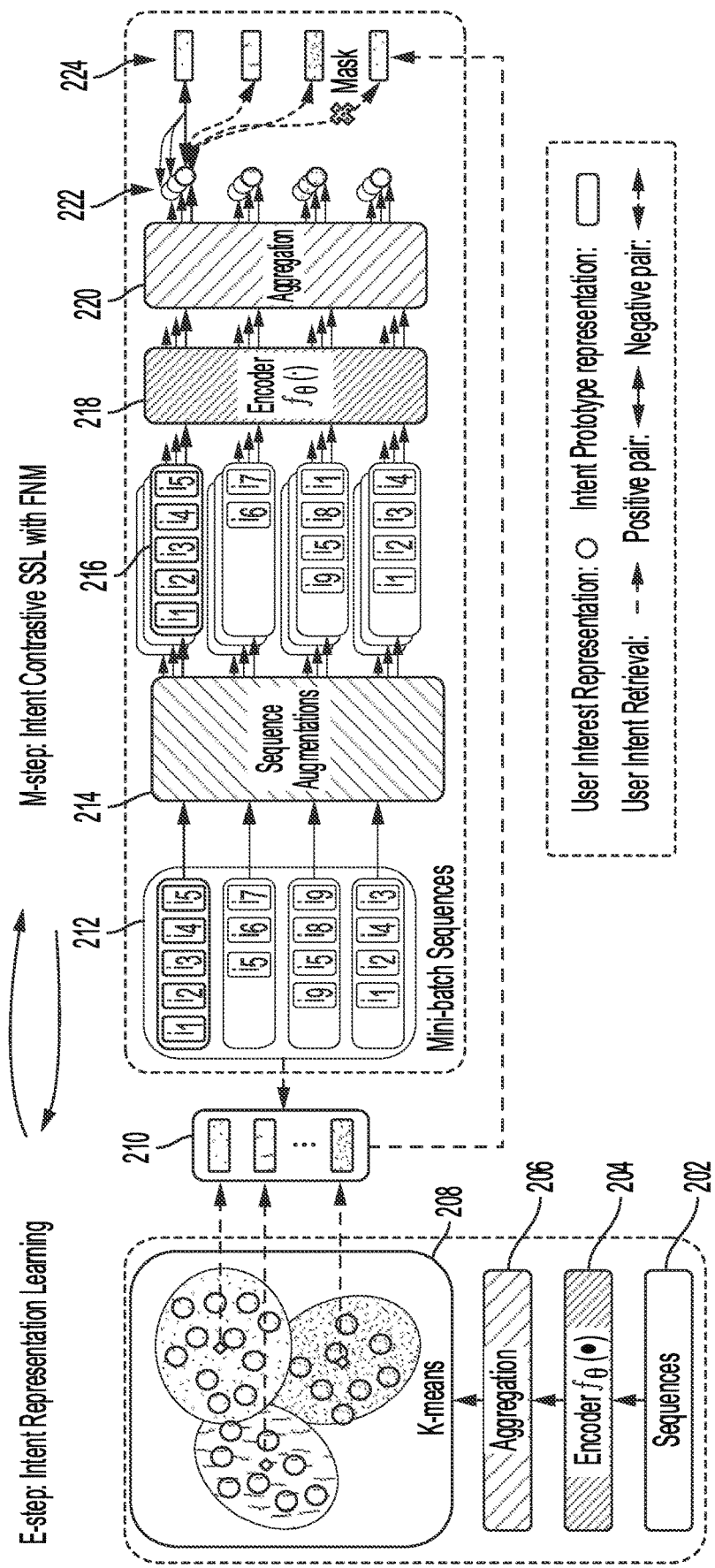
FIG. 2 is a simplified diagram showing an example method for contrastive learning for sequential recommendation, according to some embodiments.

FIG. 2 is a simplified diagram showing an example method for contrastive learning for sequential recommendation, according to some embodiments. The contrastive learning method in some aspects alternately performs intent representation learning (E-step) and intent contrastive SSL with FNM (M-step) within the generalized EM framework to maximize mutual information between a behavior sequence and its corresponding intent prototype. Before describing the components of FIG. 2, the mathematical framework will first be developed.

Assuming that there are K latent intent prototypes $\{c_i\}_{i=1}^K$ that affect users' decisions to interact with items, then based on the above equations for $\theta^*$ and $P_\theta(s^u)$, the objective may be rewritten as:

$$\theta^* = \arg\max \Sigma_{u=1}^N \Sigma_{t=1}^T \ln \mathbb{E}_{(c)}[P_\theta(s_t^u, c_i)]$$

To make optimization easier, a lower bound of this function may be used, assuming intent c follows distribution $Q(c)$, where $\Sigma_c Q(c_i) = 1$ and $Q(c_i) \geq 0$ as follows:

$$\sum_{u=1}^{N}\sum_{t=1}^{T}\ln\mathbb{E}_{(c)}[P_\theta(s_t^u, c_i)]$$
$$= \sum_{u=1}^{N}\sum_{t=1}^{T}\ln\sum_{i=1}^{K} P_\theta(s_t^u, c_i)$$
$$= \sum_{u=1}^{N}\sum_{t=1}^{T}\ln\sum_{i=1}^{K} Q(c_i)\frac{P_\theta(s_t^u, c_i)}{Q(c_i)}$$

Based on the Jensen's inequality, the term in the above equation is $$\geq \sum_{u=1}^{N}\sum_{t=1}^{T}\sum_{i=1}^{K} Q(c_i)\ln\frac{P_\theta(s_t^u, c_i)}{Q(c_i)}$$
$$\propto \sum_{u=1}^{N}\sum_{t=1}^{T}\sum_{i=1}^{K} Q(c_i)\cdot\ln P_\theta(s_t^u, c_i)$$

Where the $\propto$ stands for "proportional to" (i.e., up to a multiplicative constant). The inequality will hold with equality when intent distribution function $Q(c_i)=P_\theta(c_i|S^u)$. By focusing on the last positional step (i.e., t=T) when optimizing the lower bound, and allowing $Q(c_i)=P_\theta(c_i|S^u)$, the last positional step is defined as:

$$\Sigma_{u=1}^{N}\Sigma_{i=1}^{K} Q(c_i)\cdot\ln P_\theta(S^u, c_i)$$

The model is alternately optimized between the Intent Representation Learning (E-step) and the Intent Contrastive SSL with FNM (M-step), which follows a generalized expectation-maximization (EM) framework. The whole process may be referred to as Intent Contrastive Learning (ICL). In each iteration, intent distribution function Q(c) and the model parameter θ are updated.

Referring now to the components of FIG. 2, and specifically the E-Step portion, to learn the intent distribution function Q(c), the encoder 204 encodes all the sequences 202 $\{S^u\}_{u=1}^{|U|}$ with the encoder 204 followed by an aggregation layer 206. Aggregation layer 206 may be performed using a number of aggregation techniques, including a mean pooling operation over all position steps. After aggregation layer 206, clustering is performed over all sequence representations $\{h^u\}_{u=1}^{|U|}$ using K-means clustering to obtain K clusters 208. Centroids of the clusters are then used to define intention prototypes 210. After determining clusters, the distribution function $Q(c_i)$ is defined as follows:

$$Q(c_i)=P_\theta(c_i|S^u)=\{1 \text{ if } S^u \text{ in cluster } i; 0 \text{ else}\}$$

At the M-step, sequence augmentations 214 may augment mini-batches of user behavior sequences 212. For example, augmentation methods such as masking items from sequences, rearranging the order of items in a sequence, etc. may be utilized. Augmented sequences 216 may then be passed through encoder 218. Encoder 218 may be the same encoder as encoder 204, such that when it is updated, encoder 204 is also updated. The M-step also includes an aggregation step 220 which aggregates the encoded sequences. A contrastive loss is computed between user interest representations 222 with false-negative mitigation (FNM). FNM is accomplished by masking user interest representations such that they do not contribute to the contrastive loss when the contrasted user interest representation is represented by the same intention prototype 224.

Assuming that the prior over intents follow the uniform distribution and the conditional distribution of $S^u$ given c is isotropic Gaussian with L2 normalization, then $P_\theta(S^u, c_i)$ can be rewritten as follows:

$$P_\theta(S^u, c_i) = P_\theta(c_i)P_\theta(S^u|c_i) = \frac{1}{K}\cdot P_\theta(S^u|c_i)$$
$$\propto \frac{1}{K}\cdot\frac{\exp(-(h^u - c_i)^2)}{\sum_{j=1}^{K}\exp(-(h_i^u - c_j)^2)}$$

$$\propto \frac{1}{K}\cdot\frac{\exp(h^u \cdot c_i)}{\sum_{j=1}^{K}\exp(h^u \cdot c_j)}$$

where $h^u$ and $c_u$ are vector representations of $S^u$ and $c_i$, respectively. By combining equations above, maximizing the lower bound function is equivalent to minimizing the following loss function:

$$-\sum_{u=1}^{N}\log\frac{\exp(sim(h^u, c_i))}{\sum_{j=1}^{K}\exp(sim(h^u, c_j))}$$

In the equation above, sim(·) is a dot product. Minimizing this equation in fact would maximize mutual information between one individual sequence and its corresponding intent. This equation has a similar form as the equations for $\mathcal{L}_{SeqCL}(\tilde{h}_1^u,\tilde{h}_2^u)$ which tries to maximize mutual information between two individual sequences. Note that, sequence augmentations are required in SeqCL to create positive views for $\mathcal{L}_{SeqCL}(\tilde{h}_1^u,\tilde{h}_2^u)$ While in ICL, sequence augmentations are optional, as the view of a given sequence is its corresponding intent that learnt from original dataset. A benefit, however, of sequence augmentations is that it enlarges the training set and may optimize the model with respect to θ. Formally, given a batch of training sequences $\{s_u\}_{u=1}^N$ first two positive views of a sequence as described above with the equation for $\tilde{S}_1^u$ are created, and then the following loss function is optimized:

$$\mathcal{L}_{ICL}=\mathcal{L}_{SeqCL}(\tilde{h}_1^u,c_u)+\mathcal{L}_{ICL}(\tilde{h}_2^u,c_u)$$

and $$\mathcal{L}_{ICL}(\tilde{h}_1^u, c_u) = -\log\frac{\exp(sim(\tilde{h}_1^u, c_u))}{\sum_{v=1}^{N}\mathbb{1}_{v\notin\mathcal{F}}\exp(sim(\tilde{h}_1, c_v))}$$

In the above equation, $c_{neg}$ are all the intents in the given batch. However, directly optimizing the equation for $\mathcal{L}_{ICL}(\tilde{h}_1^u,c_u)$ can introduce false-negative samples since users in a batch can have same intent. To mitigate the effects of false-negatives, The model uses the FNM strategy by not contrasting against them as follows:

$$\mathcal{L}_{ICL}(\tilde{h}_1^u, c_u) = -\log\frac{\exp(sim(\tilde{h}_1^u, c_u))}{\sum_{v=1}^{N}\mathbb{1}_{v\notin\mathcal{F}}\exp(sim(\tilde{h}_1, c_v))}$$

where $\mathcal{F}$ is a set of users that have same intent as u in the mini-batch.

The SR model may be trained with a multi-task training strategy to jointly optimize ICL via, the main next-item prediction task, and a sequence level SSL task. Formally, the joint loss for training the SR model $f_\theta$ is as follows:

$$\mathcal{L}=\mathcal{L}_{NextItem}+\lambda\cdot\mathcal{L}_{ICL}+\beta\cdot\mathcal{L}_{SeqCL}$$

In the equation above, $\lambda$ and $\beta$ control the strengths of the ICL task and sequence level SSL tasks, respectively. For example, $\lambda$ and $\beta$ may take values such as 0.2, 0.3, 0.4, and/or the like.

Figure 3:
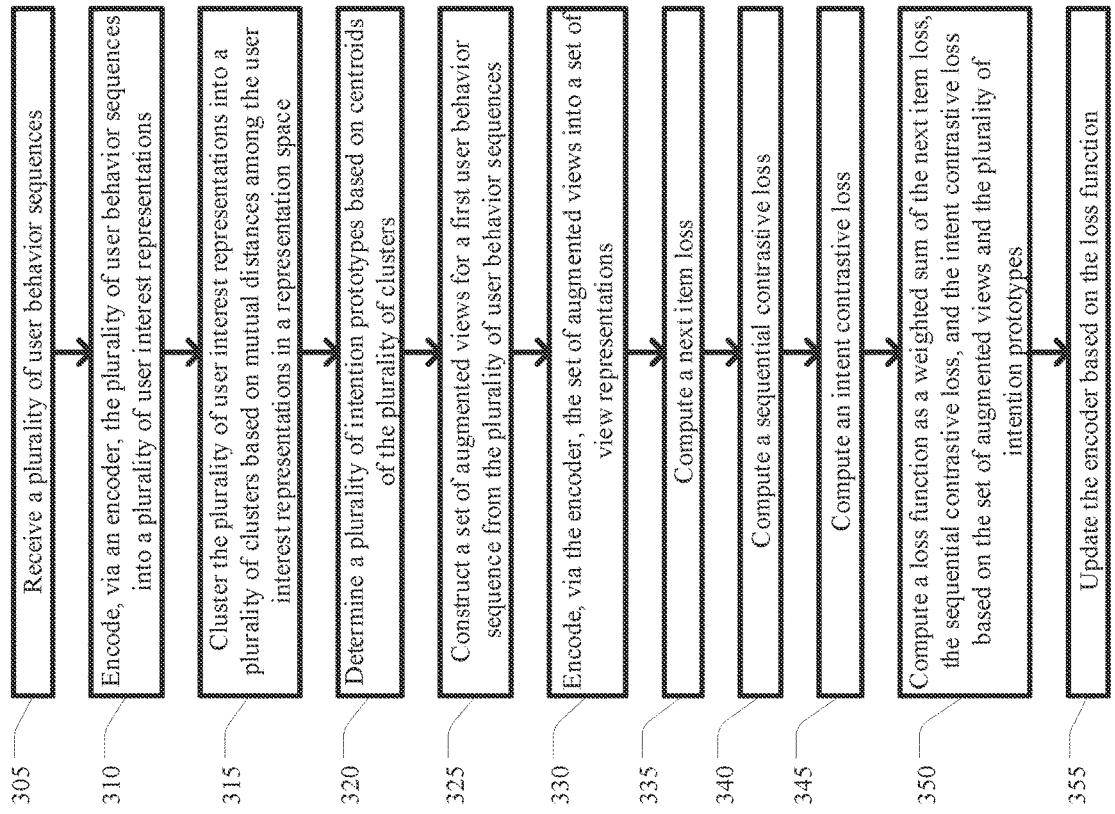
FIG. 3A provides an example pseudo-code segment illustrating an example algorithm for training a sequential recommendation system, according to some embodiments.
FIG. 3B provides an example logic flow diagram illustrating an example algorithm for training a sequential recommendation system, according to some embodiments.

FIG. 3A provides an example pseudo-code segment illustrating an example algorithm 300 for training a sequential recommendation system, and FIG. 3B provides an example logic flow diagram illustrating algorithm 300, according to some embodiments herein. One or more of the processes described in FIGS. 3A and 3B may be implemented, at least in part, in the form of executable code stored on non-transitory, tangible, machine-readable media that when run by one or more processors may cause the one or more processors to perform one or more of the processes 305-355. In some embodiments, method 300 may correspond to the method used by the module 430 in FIG. 4.

At step 305, a plurality of user behavior sequences is received. These sequences may, for example, by sequences of items purchased by a user. In some aspects, the sequence may include other actions by a user such as clicking links, making a purchase, moving the mouse onto an item icon, commenting or "liking" an item, or otherwise interacting with the item.

At step 310, an encoder encodes the plurality of user behavior sequences into a plurality of user interest representations. The encoder may output user interest representations for each time step in each of the received sequences.

At step 315, the plurality of user interest representations are clustered into a plurality of clusters based on mutual distances among the user interest representations in a representation space. For example, K-means clustering may be performed which partitions the observations into K clusters in which each observation belongs to the cluster with the nearest centroid, which serves as the user intent prototype.

At step 320, The method may determine a plurality of intention prototypes based on centroids of the plurality of clusters.

At step 325, The method may construct a set of augmented views for a first user behavior sequence from the plurality of user behavior sequences. Augmented views, for example, may include views where the sequence has items masked, or rearranged.

At step 330, the method may encode, via the encoder, the set of augmented views into a set of view representations.

At step 335, The method may compute a next item loss. In some aspects, the next item loss is based on a summation of user next item losses corresponding to a number of users (e.g. as in the $\mathcal{L}_{NextItem}$ equation discussed above). Each user next item loss may be computed based on a similarity between a first positive view representation and an embedding of a target item, and a plurality of similarities between the first positive view and a set of embeddings of user behavior sequences that do not correspond to the respective user, as discussed above with reference to the $\mathcal{L}_{NextItem}(u,t)$ equation.

At step 340, The method may compute a sequential contrastive loss. The sequential contrastive loss may be computed based on a summation of user sequential contrastive losses corresponding to a number of users, which is described with respect to the $\mathcal{L}_{SeqCL}$ equation above. Each user sequential contrastive loss may be computed based on a similarity between a first positive view representation and a second positive view representation, and a plurality of similarities between the first positive view and a set of negative view representations that do not correspond to the respective user. For example, refer to the $\mathcal{L}_{SeqCL}(\tilde{h}_1^u, \tilde{h}_2^u)$ equation described above.

At step 345, The method may compute an intent contrastive loss that reflects the mutual information is between user behavior sequences and the intention prototypes. Sequences from different users may be treated as positive views of each other when they share a similar intent evidenced by their intention prototype. When views are positive views of each other, they are masked such that the loss equation does not use them as contrastive pairs. Specifically, the intent contrastive loss is computed based on a summation of user contrastive losses corresponding to a number of users. For example, refer to the equation for $\mathcal{L}_{ICL}$ described above. Each user contrastive loss is computed based on a first similarity between a first positive view representation and an intention prototype corresponding to a respective user, and a plurality of similarities between the first positive view and a set of intention prototypes that do not correspond to the respective user. For example, refer to the equation for $\mathcal{L}_{ICL}(\tilde{h}_1^u, c_u)$ above.

At step 350, The method may compute a loss function as a weighted sum of the next item loss, the sequential contrastive loss, and the intent contrastive loss based on the set of augmented views and the plurality of intention prototypes. The weights of each component may be hyper parameters, or in some aspects may be trained parameters.

At step 355, The method may update the encoder based on the loss function.

In some embodiments, method 300 or portions of method 300 may repeat multiple times until the model is trained. For example, user behavior sequences may be broken into batches so that each iteration only uses a subset of the user behavior sequences.

Figure 4:
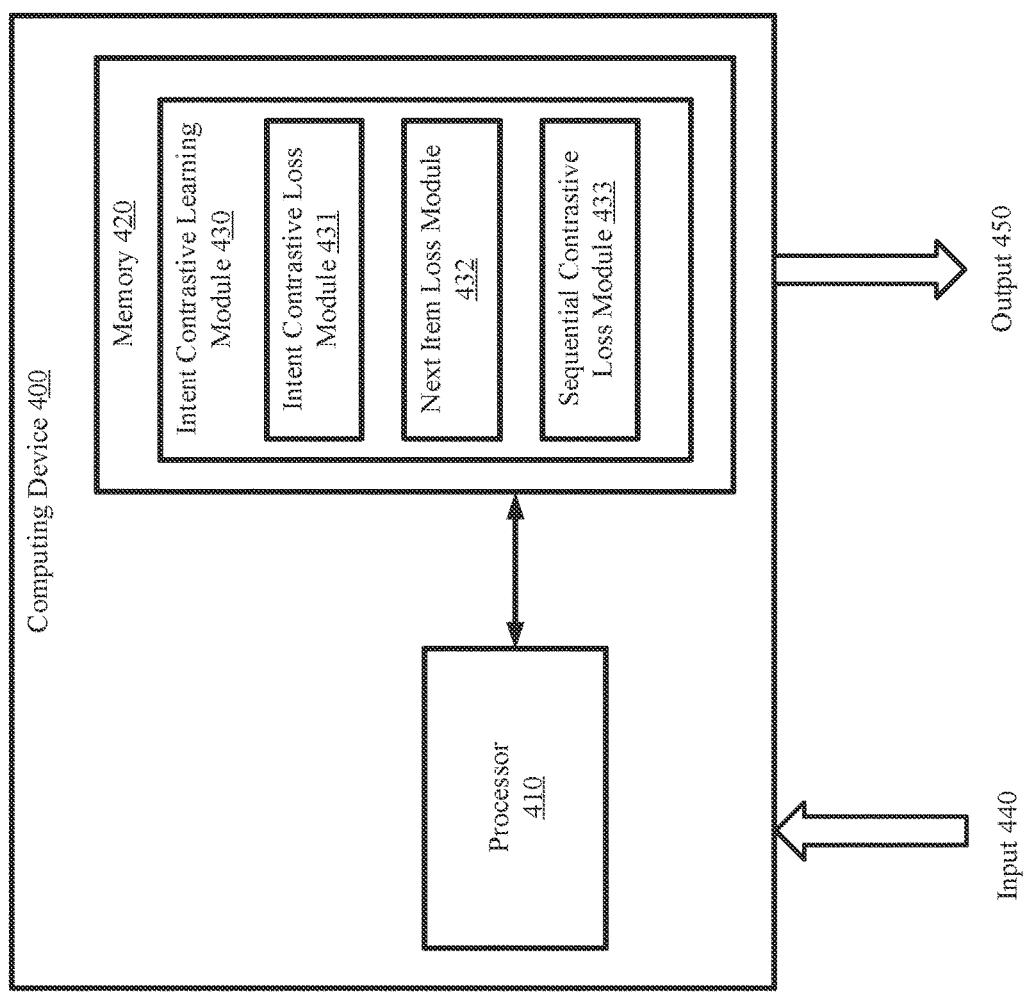
FIG. 4 is a simplified diagram of an exemplary computing device that implements sequential recommendation methods, according to some embodiments.

FIG. 4 is a simplified diagram of a computing device that implements the contrastive learning framework for sequential recommendation, according to some embodiments described herein. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for an intent contrastive learning module 430, which may be used to implement the systems and methods described herein. Intent contrastive learning module 430 may include an intent contrastive loss module 431, a next item loss module 432, and a sequential contrastive loss module 433. Each of these modules may be used to compute their respective losses. For example, intent contrastive loss module 431 may compute an intent contrastive loss as performed by method 300 at step 345. Next item loss module 432 may compute a next item loss as performed by method 300 at step 335. Sequential contrastive loss module 433 may compute a sequential contrastive loss as performed by method 300 at step 340.

Intent contrastive learning module 430 may use a weighted combination of the losses in order to train and minimize the combined loss by updating model parameters, such as the parameters for the encoder described in method 300 with respect to steps 310 and 330.

In some examples, the intent contrastive learning module 430, may receive an input 440, e.g. such as a set of user behavior sequences. The intent contrastive learning module 430 may generate an output 450, such as a next item prediction. The prediction may be based on the entire model which is used for training, or in some aspects the prediction may use the pre-trained encoder which was trained with the entire model, but only using a subset of the model. The intent contrastive learning module 430 may be implemented using hardware, software, and/or a combination of hardware and software.

Some examples of computing devices, such as computing device 400 may include non-transitory, tangible, machine readable media that include executable code that when run by one or more processors (e.g., processor 410) may cause the one or more processors to perform the processes of method 200. Some common forms of machine readable media that may include the processes of method 200 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

The following is a description certain performance characteristics of a model according to embodiments herein. Specifically, an intent contrastive learning recommender (ICLRec) compared to a number of other recommender models under a variety of metrics.

FIG. 5 provides an example table illustrating example performance of different sequential recommendation methods including one embodiment discussed herein. Models in the comparison include: BPR described in Rendle et al., BPR: Bayesian personalized ranking from implicit feedback, arXiv preprint arXiv: 1205.2618, 2012; GRU4Rec described in Hidasi et al., Session-based recommendations with recurrent neural networks, arXiv preprint arXiv: 1511.06939, 2015; Caser described in Tang et al., Personalized top-n sequential recommendation via convolutional sequence embedding, in WSDM, pages 565-573, 2018; SASRec described in Kang et al., Self-attentive sequential recommendation, in ICDM, pages 197-206, 2018; DSSRec described in Ma et al., Disentangled self-supervision in sequential recommenders, in Proceedings of the $26^{th}$ ACM SIGKDD International Conference on Knowledge Discovery & Data Mining, pages 483-491, 202; BERT4Rec described in Sun et al., Sequential recommendation with bidirectional encoder representations from transformer, in CIKM, pages 1441-1450, 2019; $S^3$-$Rec_{ISP}$ described in Zhou et al., Self-supervised learning for sequential recommendation with mutual information maximization, in Proceedings of the $29^{th}$ ACM International Conference on Information & Knowledge Management, pages 1893-1902, 2020; and CL4SRec described in Xie et al., Contrastive Learning for Sequential Recommendation, arXiv preprint arXiv: 2010.14395, 2020. The best score is bolded in each row, and the second best is underlined. The last two columns are the relative improvements compared with the best baseline results.

As shown in FIG. 5, BPR performs worse than sequential models in general, which indicates the importance of mining the sequential patterns under user behavior sequences. As for standard sequential models, SASRec utilizes a Transformer based encoder and achieves better performance than Caser and GRU4Rec. This demonstrates the effectiveness of Transformer for capturing sequential patterns. DSSRec further improves SASRec's performance by using a seq2seq training strategy and reconstructs the representation of the future sequence in latent space for alleviating non-convergence problems. When it comes to sequential models that leverage SSL to enhance representations of items or users, BERT4Rec and S3-Rec can exhibit worse performance than SASRec in some datasets (e.g., in the Toys dataset). The reason might be that both BERT4Rec and S3-Rec aim to incorporate context information of given user behavior sequences via masked item prediction. Such a goal does not align well with next item prediction, and it requires that each user behavior sequence is long enough to provide complete 'context' information. Thus their performances are restricted when most sequences are short. Besides, S3-Rec is proposed to fuse additional contextual information. Without such features, its two-stage training strategy prevents information sharing between the next-item prediction and SSL tasks, thus leading to poor results. CL4SRec consistently performs better than other baselines, demonstrating the effectiveness of enhancing sequence representations via contrastive SSL on an individual user level.

Finally, ICLRec consistently outperforms existing methods on all datasets. The average improvements compared with the best baseline ranges from 7.47% to 33.33% in HR and NDCG. The proposed ICL estimates a good distribution of intents and fuses them into SR model by a new contrastive SSL, which helps the encoder discover a good semantic structure across different user behavior sequences.

FIGS. 6A-6B provide example charts illustrating performance comparisons of different models including one embodiment discussed herein. The user "cold start" problem is one of the typical data-sparsity issues that recommender systems often face, i.e., most users have limited historical behaviors. To check whether ICL improves the robustness under such a scenario, user behavior sequences were split into three groups based on their behavior sequences' length, keeping the total number of behavior sequences the same. Models are trained and evaluated on each group of users independently. FIGS. 6A-6B show the comparison results on Beauty and Yelp Datasets. As is illustrated, the proposed ICLRec consistently performs better than SASRec among all user groups while CL4SRec fails to outperform SASRec in most datasets when user behavior sequences are short. This demonstrates that CL4SRec requires individual user behavior sequences long enough to provide 'complete' information for auxiliary supervision while ICLRec reduces the need by leveraging user intent information, thus consistently benefiting user representation learning even when users have limited historical interactions. Additionally, compared with CL4SRec, the improvement of ICLRec is mainly because it provides better recommendations to users with low interaction frequency. This verifies that user intent information is beneficial, especially when the recommender system faces data-sparsity issues where information in each individual user sequence is limited.

Figure 7A:
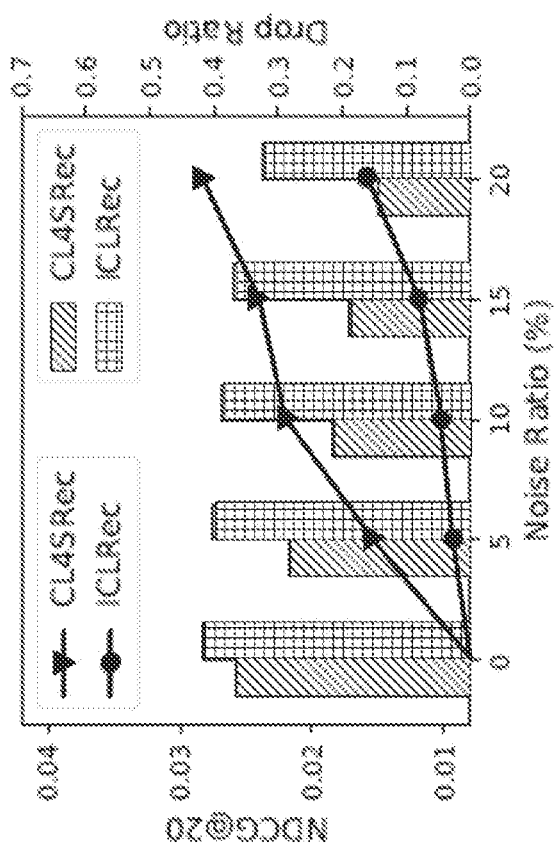
FIGS. 7A-7B provide example charts illustrating performance comparisons with respect to noise ratio of different models including one embodiment discussed herein.
Figure 7B:
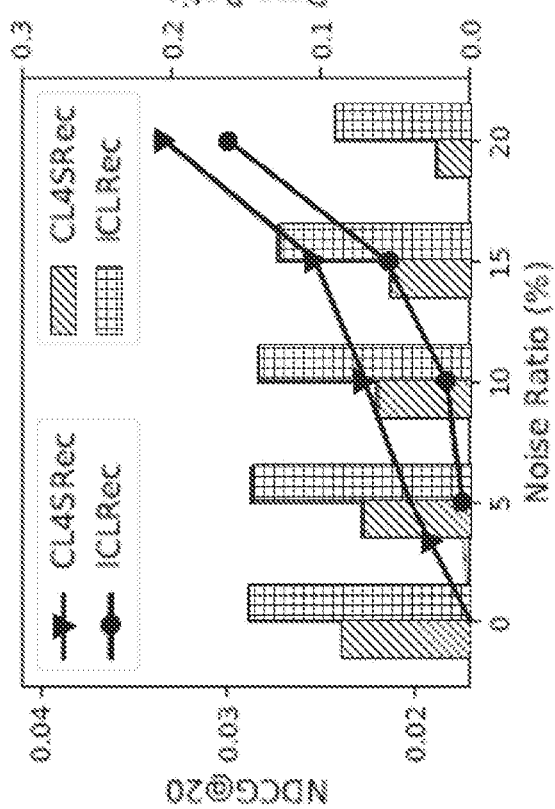

FIGS. 7A-7B provide example charts illustrating performance comparisons with respect to noise ratio of different models including one embodiment discussed herein. This tested against data with noisy interactions in the test phase. Specifically, a randomly added proportion (i.e., 5%, 10%, 15%, 20%) of negative items to test sequences. From FIGS. 7A and 7B it is shown that adding noisy data deteriorates the performance of CL4SRec and ICLRec. However, the performance drop ratio of ICLRec is consistently lower than CL4SRec, and its performance with 15% noise proportion can still outperforms CL4SRec without noisy dataset on Sports. The reason might be the leveraged intent information is collaborative information that is distilled from all the users. ICL helps the SR model capture semantic structures from user behavior sequences, which make ICLRec to be less sensitive to a certain random perturbation on individual sequences.

FIG. 8 provides an example table illustrating example performance of different sequential recommendation methods discussed herein. ICLRec contains a novel ICL objective, a false-negative noise mitigation (FNM) strategy, a SeqCL objective, and sequence augmentations. FIG. 8 represents the results of an ablation study on four datasets. (A) is an example of a model with all each of FNM, ICL, and sequence augmentation. (B) to (F) are ICLRec with certain components removed. From (A)-(B), as is shown, the FNM leverages the learned intent information to avoid users with similar intents pushing away in their representation space which helps the model to learn better user representations. Compared with (A)-(D), without the proposed ICL, the performance drops significantly, which demonstrates the effectiveness of ICL. Compared with (A)-(C), individual user level mutual information also helps to enhance user representations. Compared with (E)-(F), ICL can perform contrastive SSL without sequence augmentations and outperforms SASRec. While CL4SRec requires the sequence augmentation module to perform contrastive SSL. Comparison between (C) and (E) indicates sequence augmentation enlarges the training set, which improves performance. Since ICL is a model-agostic learning paradigm, ICL as added to the S3-RecISP model in the fine-tuning stage is shown in FIG. 8 to further illustrate its effectiveness. The S3-RecISP model is also shown to benefit from the ICL objective. The average improvement over the four datasets is 41.11% in NDCG@20, which further demonstrates the effectiveness and practicality of ICLRec.

Figures 9A, 9B:
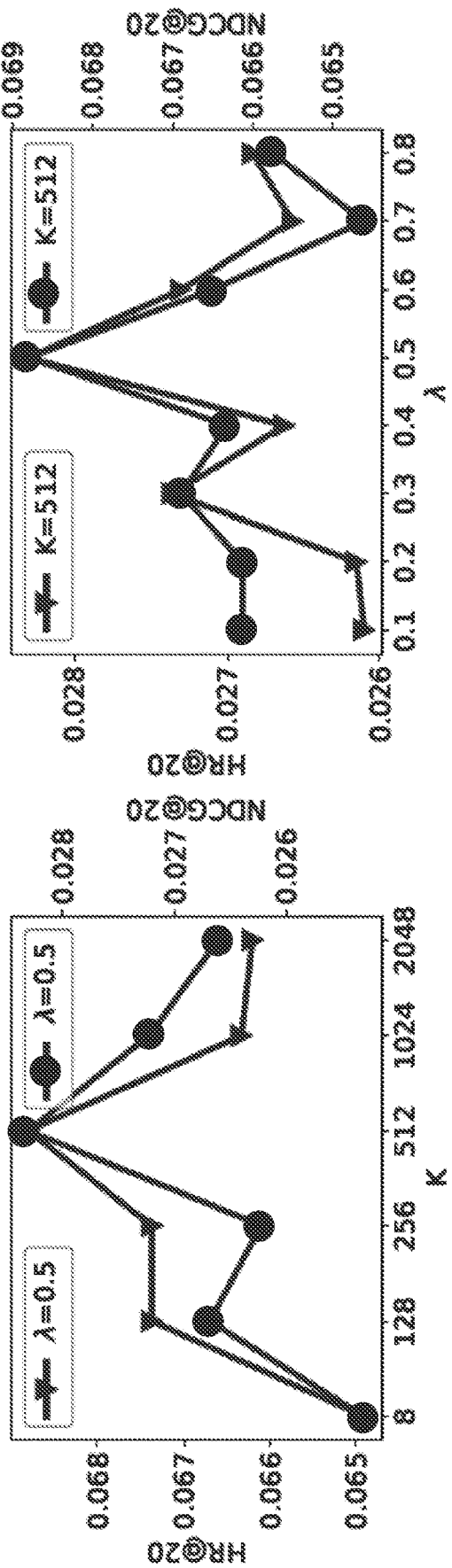
FIGS. 9A-9B provide example charts illustrating the effect of different values for hyper parameters according to some embodiments.

FIGS. 9A-9B provide example charts illustrating the effect of different values for hyper parameters according to some embodiments. Specifically, the impact of the number of user intent classes K and the relative strength of the ICL objective A. A larger value K means users can have more diverse intentions. The larger value A means the ICL task contributes more to the final model. The illustrated charts represent experiments on the Yelp dataset. As is shown with this example embodiment, ICLRec reaches its best performance when increasing K to 512, and then it starts to deteriorate as K becomes larger. When K is very small, the number of users under each intent prototype can potentially be large. As a result, false-positive samples (i.e., users that actually have different intents are considered as having the same intent erroneously) are introduced to the contrastive SSL, thus affecting learning. On the other hand, when K is too large, the number of users under each intent prototype is small, the introduced false-negative samples will also impair contrastive SSL. In Yelp, 512 user intents summarize users' distinct behaviors best. Additionally, A 'sweet-spot' of $\lambda=0.5$ can also be found as is shown in FIG. 9B. This indicates that the ICL task can benefit the recommendation prediction as an auxiliary task.

Figure 10A:
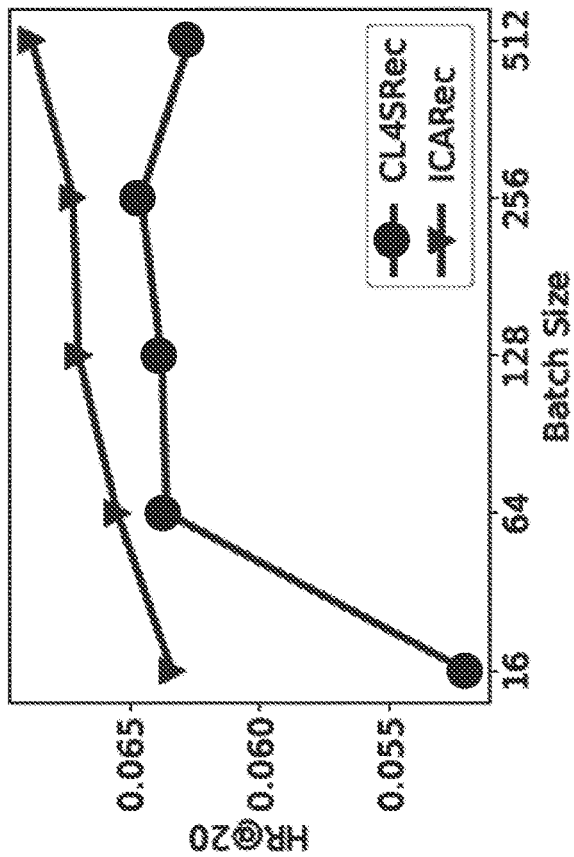
FIGS. 10A-10B provide example charts illustrating performance comparisons with respect to batch size of different models including one embodiment discussed herein.
Figure 10B:
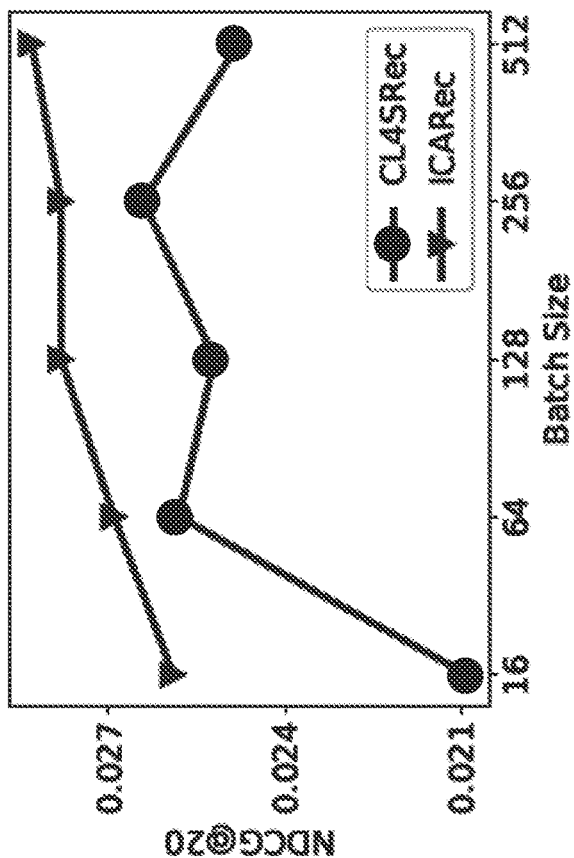

FIGS. 10A-10B provide example charts illustrating performance comparisons with respect to batch size of different models including one embodiment discussed herein. Specifically, a comparison of results with respect to batch size on the Yelp dataset between CL4SRec and ICLRec, since existing contrastive SSL for SR highly depends on the training batch size to create negative samples for contrastive loss. As is shown, as the batch size increases, CL4SRec's performance does not continually improve. The reason might because of larger batch sizes introduce false-negative samples, which harms learning. While ICLRec is relatively stable with different batch sizes, and outperforms CL4SRec in all circumstances. Because the intent learnt in E-step can be seen as a pseudo label of sequences, which helps identify the true positive and true negative samples via the proposed contrastive SSL with FNM.

FIG. 11 provides an example table illustrating quantitative performance results. The Amazon Sports dataset used in the illustrated table contains 2,277 fine-grained item categories, and the Yelp dataset provides 1,001 business categories. These attributes were utilized to study the effectiveness of the proposed ICLRec qualitatively and quantitatively. Given a user behavior sequence $S^u$, consider the mean of its corresponding trainable item category embedding as the intent prototype c, aiming to replace the intent representation learning described above. The corresponding model named ICLRec-A is illustrated in the table. On Sports, ICLRec-A performs better than CL4SRec, which shows the potential benefits of leveraging item category information. ICLRec achieves similar performance as ICLRec-A's when K=2048. Joint analysis with the above qualitative results indicates that ICL can capture meaningful user intents via SSL. ICLRec can outperform ICLRec-A when K=1024. Users' intents may be better described by the latent variables when K=1024 thus improving performance. (e.g., parents of the existing item categories).

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure.

Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for sequential recommendation based on user intent modeling, the method comprising:
   receiving a plurality of user behavior sequences;
   encoding, via an encoder, the plurality of user behavior sequences into a plurality of user interest representations;
   clustering the plurality of user interest representations into a plurality of clusters based on mutual distances among the user interest representations in a representation space;
   determining a plurality of intention prototypes based on centroids of the plurality of clusters;
      constructing a set of augmented views for a first user behavior sequence from the plurality of user behavior sequences;
      encoding, via the encoder, the set of augmented views into a set of view representations;
      computing a contrastive loss based on a summation of user contrastive losses corresponding to a number of users, wherein each user contrastive loss is computed based on a first similarity between a first positive view representation and an intention prototype of the plurality of intention prototypes corresponding to a respective user, and a plurality of similarities between the first positive view representation and a set of intention prototypes of the plurality of intention prototypes that do not correspond to the respective user; and
   iteratively updating the encoder to minimize the contrastive loss alone or in weighted combination with an additional loss component.

2. The method of claim 1, wherein the clustering the plurality of user interest representations is performed based on K-means clustering.

3. The method of claim 1, wherein the set of intention prototypes are different from the intention prototype corresponding to the respective user.

4. The method of claim 1, further comprising:
   computing a next item loss based on a summation of user next item losses corresponding to a number of users, wherein each user next item loss is computed based on a similarity between a first positive view representation and an embedding of a target item, and a plurality of similarities between the first positive representation view and a set of embeddings of user behavior sequences that do not correspond to the respective user.

5. The method of claim 1, further comprising:
   computing a sequential contrastive loss based on a summation of user sequential contrastive losses corresponding to a number of users,
   wherein each user sequential contrastive loss is computed based on a similarity between a first positive view representation and a second positive view representation, and a plurality of similarities between the first positive view representation and a set of negative view representations that do not correspond to the respective user.

6. The method of claim 1, further comprising:
   computing a weighted sum of the contrastive loss, a next item loss, and a sequential contrastive loss; and
   jointly updating the encoder based on the weighted sum.

7. The method of claim 1, wherein at least one user behavior sequence from the plurality of user behavior sequences includes information about a sequence of items that a user has interacted with.

8. A system for sequential recommendation based on user intent modeling, the system comprising:
   a memory that stores a sequential recommendation model;
   a communication interface that receives a plurality of user behavior sequences; and
   one or more hardware processors that:
      encodes, via an encoder, the plurality of user behavior sequences into a plurality of user interest representations;
      clusters the plurality of user interest representations into a plurality of clusters based on mutual distances among the user interest representations in a representation space;
      determines a plurality of intention prototypes based on centroids of the plurality of clusters;
      constructs a set of augmented views for a first user behavior sequence from the plurality of user behavior sequences;
      encodes, via the encoder, the set of augmented views into a set of view representations;
      computes a contrastive loss based on a summation of user contrastive losses corresponding to a number of users, wherein each user contrastive loss is computed based on a first similarity between a first positive view representation and an intention prototype of the plurality of intention prototypes corresponding to a respective user, and a plurality of similarities between the first positive view representation and a set of intention prototypes of the plurality of intention prototypes that do not correspond to the respective user; and
      iteratively updates the encoder to minimize the contrastive loss alone or in weighted combination with an additional loss component.

9. The system of claim 8, wherein the clustering the plurality of user interest representations is performed based on K-means clustering.

10. The system of claim 8, wherein the set of intention prototypes are different from the intention prototype corresponding to the respective user.

11. The system of claim 8, wherein the one or more hardware processors further:
computes a next item loss based on a summation of user next item losses corresponding to a number of users,
wherein each user next item loss is computed based on a similarity between a first positive view representation and an embedding of a target item, and a plurality of similarities between the first positive view representation and a set of embeddings of user behavior sequences that do not correspond to the respective user.

12. The system of claim 8, wherein the one or more hardware processors further:
computes a sequential contrastive loss based on a summation of user sequential contrastive losses corresponding to a number of users,
wherein each user sequential contrastive loss is computed based on a similarity between a first positive view representation and a second positive view representation, and a plurality of similarities between the first positive view representation and a set of negative view representations that do not correspond to the respective user.

13. The system of claim 8, wherein the one or more hardware processors further:
computes a weighted sum of the contrastive loss, a next item loss, and a sequential contrastive loss; and
jointly updates the encoder based on the weighted sum.

14. The system of claim 8, wherein at least one user behavior sequence from the plurality of user behavior sequences includes information about a sequence of items that a user has interacted with.

15. A processor-readable non-transitory storage medium storing a plurality of processor-executable instructions for sequential recommendation based on user intent modeling, the instructions being executed by a processor to perform operations comprising:
receiving a plurality of user behavior sequences;
encoding, via an encoder, the plurality of user behavior sequences into a plurality of user interest representations;
clustering the plurality of user interest representations into a plurality of clusters based on mutual distances among the user interest representations in a representation space;
determining a plurality of intention prototypes based on centroids of the plurality of clusters;
constructing a set of augmented views for a first user behavior sequence from the plurality of user behavior sequences;
encoding, via the encoder, the set of augmented views into a set of view representations;
computing a contrastive loss based on a summation of user contrastive losses corresponding to a number of users, wherein each user contrastive loss is computed based on a first similarity between a first positive view representation and an intention prototype of the plurality of intention prototypes corresponding to a respective user, and a plurality of similarities between the first positive view representation and a set of intention prototypes of the plurality of intention prototypes that do not correspond to the respective user; and
iteratively updating the encoder to minimize the contrastive loss alone or in weighted combination with an additional loss component.

* * * * *